Dec. 20, 1966  T. J. KELLEY  3,292,291

CAR TOP SIGN

Filed March 21, 1966

INVENTOR
THOMAS W. KELLEY
BY
ATTORNEY 3,292,291
CAR TOP SIGN
Thomas J. Kelley, 821 Osceola Ave., St. Paul, Minn.
Filed Mar. 21, 1966, Ser. No. 535,960
5 Claims. (Cl. 40—129)

This invention relates to an improvement in vehicle top signs and deals particularly with an advertising sign which may be used on the top of an automobile or similar vehicle.

During political campaigns, it is common practice for the candidates for office to promote their campaign by the use of signs placed on vehicles. Many such signs are applied to the vehicle bumpers. However, the use of signs mounted upon the tops of the vehicles has been found preferable, as signs of this type can be seen by pedestrians as well as persons riding in vehicles, and bumper signs are only particularly noticeable to other vehicle drivers. However, car top signs are usually many times more expensive than bumper signs, and quite often the available funds for such campaigns are not sufficient to purchase any quantity of car top signs. Signs of this type usually require a sturdy frame, and straps or other adjustable fastening means for anchoring the signs to the sides of the car roofs.

An object of the present invention resides in the provision of a car top sign which may be produced of relatively inexpensive material such as paperboard or the like, and which requires no external frame or complicated means for attachment of the sign to the vehicle.

The use of paperboard and similar material forming car top signs has normally been considered entirely impractical. Unless such a sign is provided with marginal reinforcement somewhat similar to a picture frame, the sign will not remain in place. It has been found, however, that if the sign is centrally folded, providing a pair of opposed side panels, and the material is again folded along the lower edges of the panels to provide mounting flanges, a structure may be produced having display surfaces on opposite sides. By applying a material such as pressure sensitive adhesive to the mounting flanges, the flanges may be adhered to the roof surface of the vehicle to extend longitudinally thereof.

A feature of the present invention resides in a provision of a car top sign which is of generally inverted V-shaped section, in which the area of the section increases gradually from front to rear. In other words, the display panels are prefarably trapezoidal in shape having parallel front and rear ends, and in which the front end of each side panel is of considerably less width than the rear edge thereof. With this arrangement, air flows through the sign between the side panels as the car moves forwardly. The air passing through the sign is subject to continuously expanding area, decreasing the air pressure and causing the sign to be drawn inwardly and downwardly toward the car top. At the same time, the air striking the outside surface of the sign has a tendency to force the sign inwardly and downwardly, thereby tending to hold the sign in place upon the car top as the vehicle moves forwardly.

A further feature of the present invention resides in the provision of a car top sign that can be produced for a small percentage of the cost of the normal car top sign. Due to the fact that the side panels of the sign are on the same surface of the sheet, both sides of the sign may be printed in a single operation. By printing or otherwise applying pressure sensitive adhesive to the attaching flanges, the sign may be secured in place by merely pressing the mounting flanges against the top surface of the car.

These and other objects and novel features of the present invention will be more clearly and fully set forth in the following specification and claims:

In the drawings forming a part of the specification;

Figure 1:
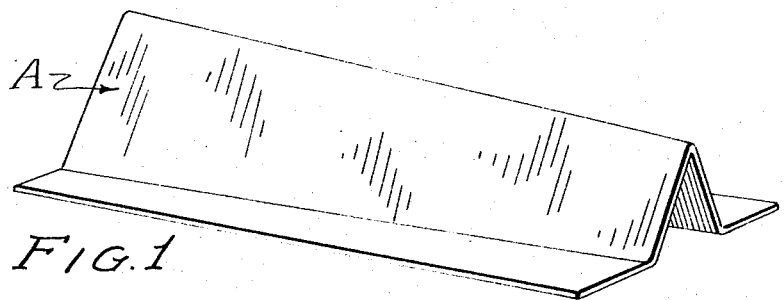
FIGURE 1 is a perspective view of the sign as it appears in use.
Figures 2, 4:
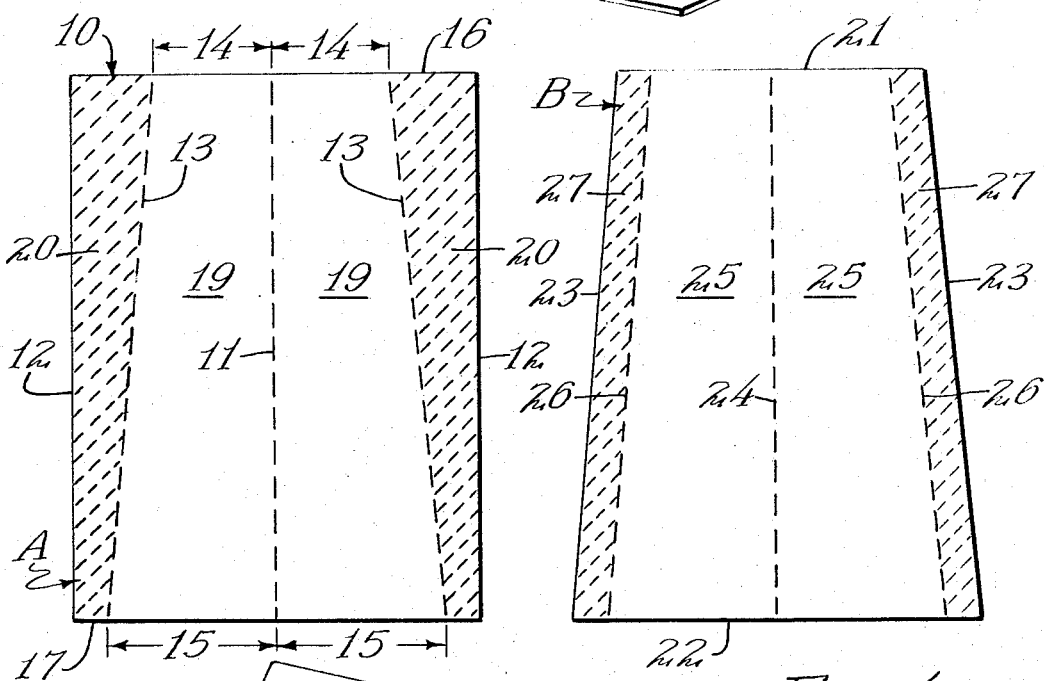
FIGURE 2 is a bottom plan view of the sign in flat formation.
FIGURE 4 is a bottom plan view of the sign illustrated in FIGURE 3.
Figure 5:
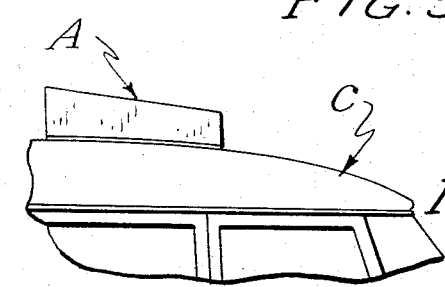
FIGURE 5 is a diagrammatic view showing the manner in which the sign is mounted upon a vehicle.

The sign A illustrated in FIGURES 1, 2, and 5 of the drawing is formed of the blank best illustrated in FIGURE 2 of the drawings. The sign illustrated in these figures comprises a rectangular sheet of paperboard, sheet plastic or other suitable material indicated in general by the numeral 10. The sheet 10 is centrally creased as indicated at 11 midway between the side edges 12 of the elongated sheet. The sheet 10 is also creased along lines 13 which are equally spaced on opposite sides of the center fold line 11, the fold lines 13 diverging somewhat apart from the forward end 16 of the sheet to the rear end 17 thereof. In other words, the fold lines 13 are spaced a relatively short distance 14 from the center line 10 along the front edge 16 of the sheet, and are spaced apart a relatively greater distance 15 along the rear edge 17 of the sheet. This produces a pair of trapezoidal side display panels on which the desired indicia is printed.

The area between the fold lines 13 and the longitudinal side edges 12 of the sheet also comprise trapezoidal anchoring flanges 20. Pressure sensitive adhesive is provided on the undersurface of a portion or all of the anchoring flanges 20 as indicated by the shading in FIGURE 2. FIGURE 2 is a bottom plan view of the sign in its flat form. If preferred, the adhesive coated area may be covered with a releasable covering material such as Holland cloth which may be removed prior to the application of the sign to the car roof.

In use, the side panels 19 are folded along the center fold line 11 so that the two panels are in inverted V-shaped form. The mounting flanges 20 are folded along the fold lines 13 to bring them into a substantially common plane as indicated in FIGURE 1 of the drawings. The flanges 20 are then firmly pressed upon the roof of the car or other vehicle B with the edge 16 of the sign foremost. As a result, the opening in the front of the sign has a cross-sectional area which is considerably less than the cross-sectional area at the rear end 17 of the sign.

In operation, as the car moves forwardly, the air passing through the forward end of the sign is subjected to a continuously increasing cross-sectional area, tending to create a partial vacuum which acts to draw the sign toward the surface of the car top. At the same time, the air flowing against the outside surface of the sign strikes an increased area of the side walls, creating a tendency to force the sign downwardly and inwardly toward the car top. As a result, there is force created tending to hold the sign in place upon the vehicle.

Figure 3:
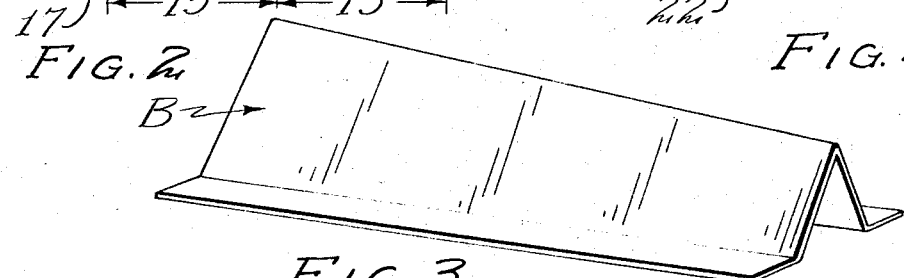
FIGURE 3 is a perspective view of a modified form of sign.

The car top sign B which is illustrated in FIGURES 3 and 4 of the drawings differs from the sign A only in the shape of the anchoring flanges. As indicated in FIGURE 4 the blank from which the sign B is formed is of trapezoidal shape having parallel end edges 21 and 22 and inclined side edges 23 which are at an equal acute angle to the rear end 22. A central fold line 24 forms a connection between a pair of trapezoidal side wall panels 25 which are identical to the side walls 19 of the sign A. Fold lines 26 connect the side walls 25 to anchoring flanges 27, the fold lines 26 being parallel to the side edges 23 so that the anchoring flanges are substantially rectangular rather than trapezoidal in shape.

The anchoring flanges are coated with pressure sensitive adhesive as indicated by the shaded areas. The sign B is used in the same manner as has been described for the sign A.

In accordance with the Patent Office statutes, I have described the principles of construction and operation of my improvement in "vehicle top signs," and while I have endeavored to set forth the best embodiment thereof, I desire to have it understood that changes may be made within the scope of the following claims without departing from the spirit of my invention.

I claim:

1. A car top carrier for use in conjunction with the top surface of a vehicle the sign including:
   a pair of side wall panels hingedly connected along a common line of fold and adapted to be supported with the fold line extending longitudinally of the car, and the side walls at an acute angle and sloping toward the top surface,
   means for adhesively securing said side wall panels to said top surface to present a passage of substantially triangular cross-section between said panels and said top surface, said means including flanges hinged to the lower edges of said side wall panels and adapted to be adhesively attached in face contact with said top surface,
   the width of said panels increasing from the forward edge thereof to the rear edge thereof to present a passage of gradually increasing cross-sectional area from front to rear of said panels where the forward edges of said panels face the front of said car.

2. The structure of claim 1 and in which the last named means comprises pressure sensitive adhesive.

3. The structure of claim 1 and in which said side panels are substantially trapezoidal with the end edges substantially parallel.

4. The structure of claim 1 and in which said flanges are trapezoidal in shape.

5. The structure of claim 1 and in which said flanges are substantially rectangular.

References Cited by the Examiner

UNITED STATES PATENTS

| | | | |
|---|---|---|---|
| 1,885,282 | 11/1932 | O'Connor | 40—129 |
| 2,632,269 | 3/1953 | Sanders | 40—129 |
| 3,208,173 | 9/1965 | Shank | 40—129 |
| 3,234,677 | 2/1966 | McDaniel et al. | 40—129 |

OTHER REFERENCES

"Jet Propulsion," by Hesse and Munford, published in 1964 by Pitman Publishing Corporation, page 55 relied upon.

EUGENE R. CAPOZIO, *Primary Examiner.*

S. M. BENDER, *Assistant Examiner.*